T. A. MIGHILL.
PEAT LAYING AND CUTTING MACHINE.
APPLICATION FILED MAR. 27, 1911.
1,053,197.
Patented Feb. 18, 1913.
3 SHEETS—SHEET 3.
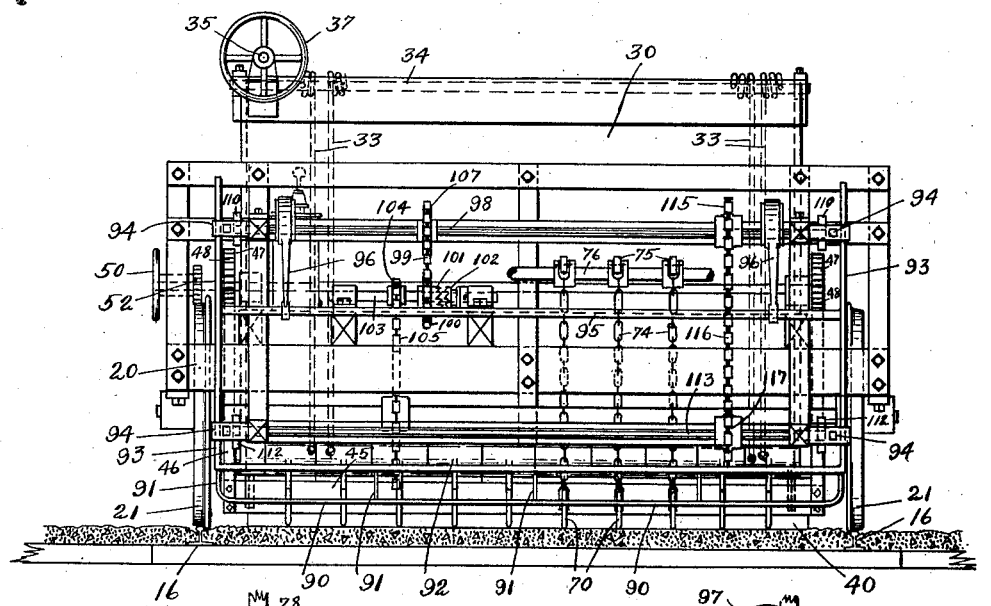
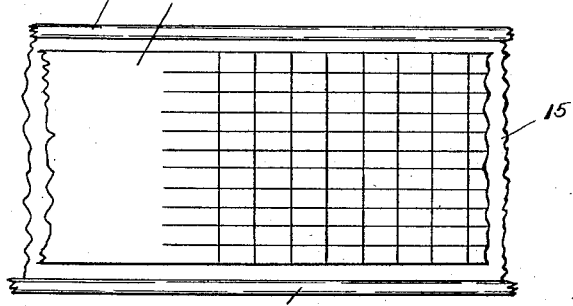

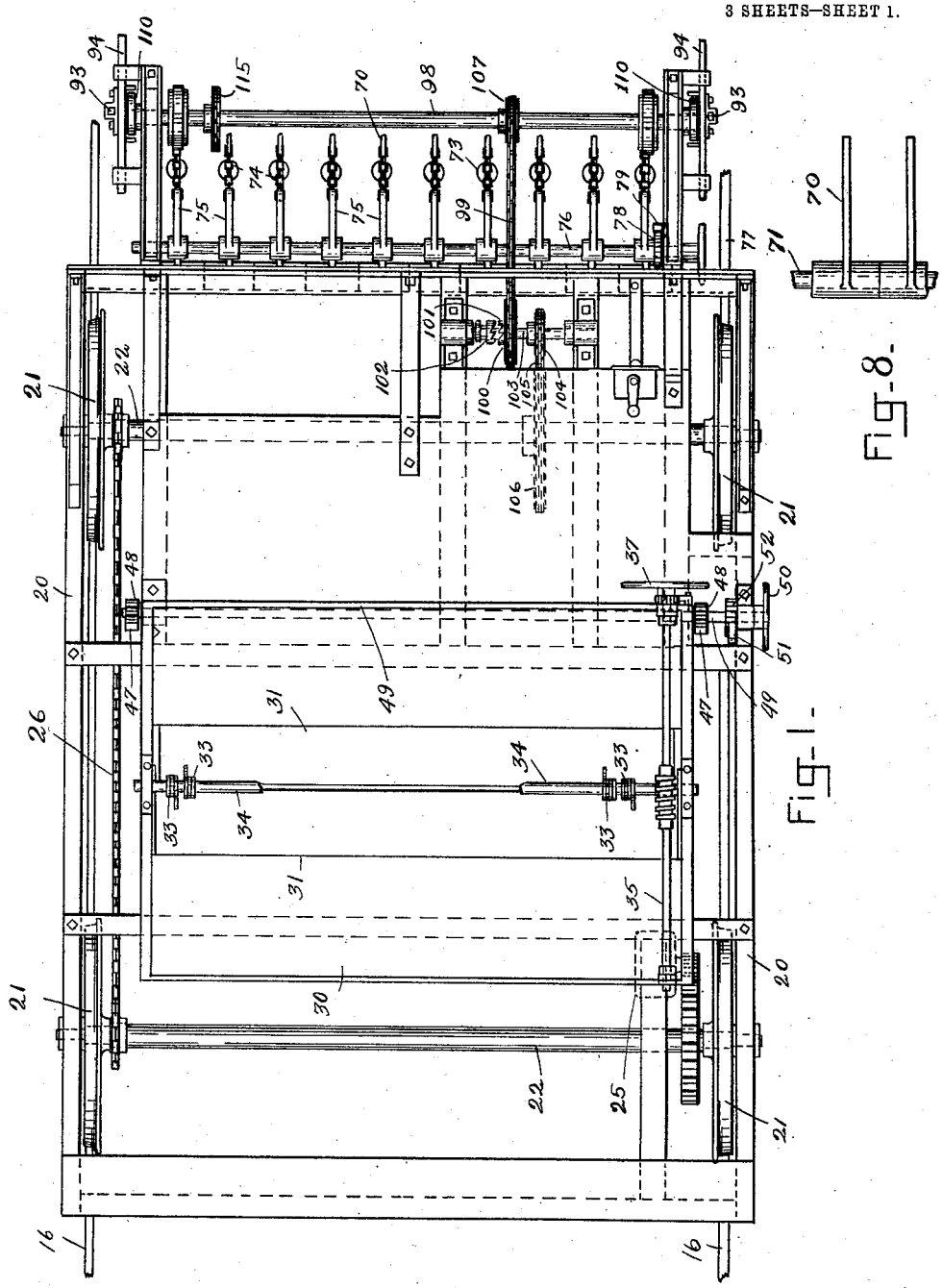

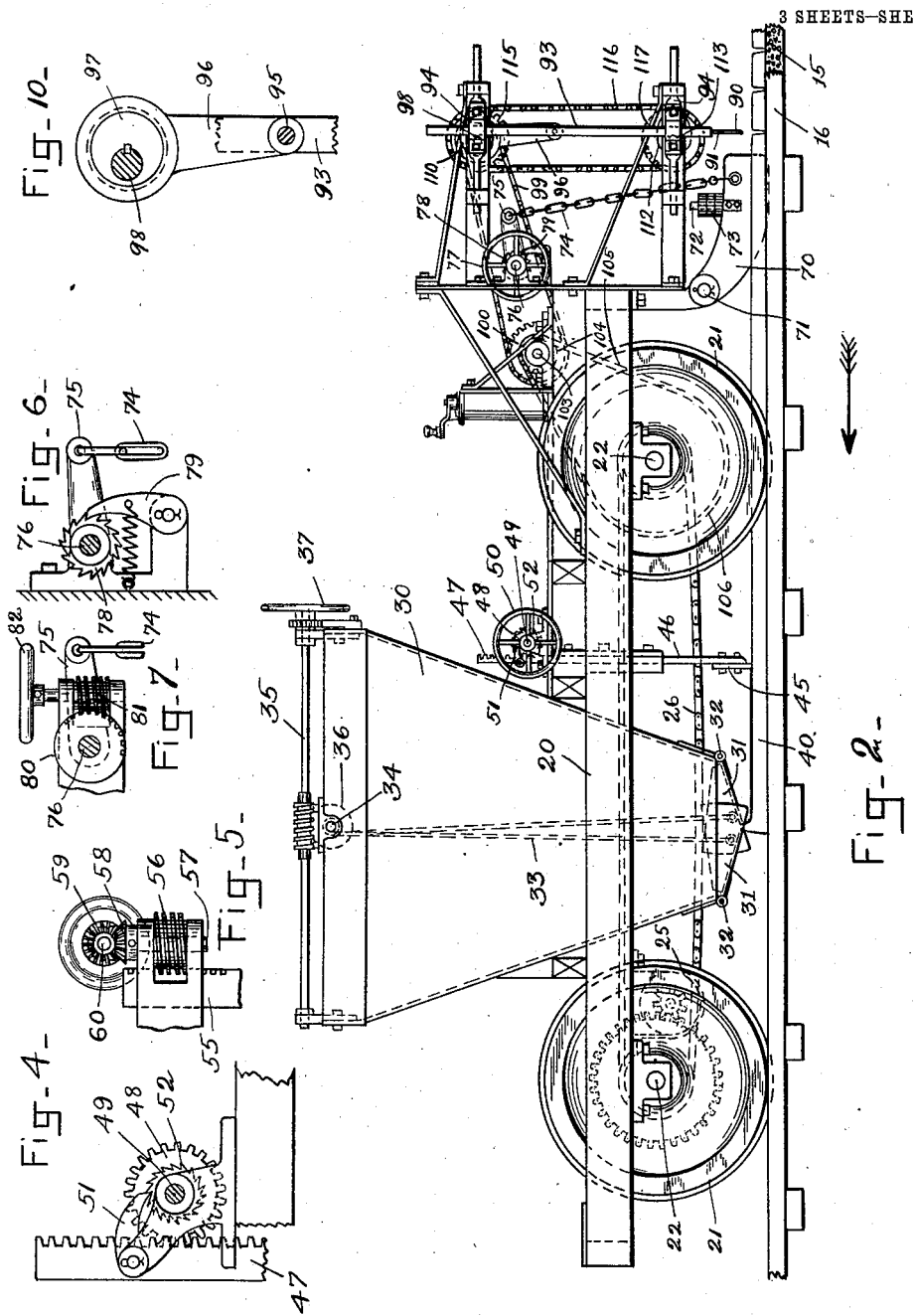

UNITED STATES PATENT OFFICE.

THOMAS A. MIGHILL, OF CAMBRIDGE, MASSACHUSETTS.

PEAT LAYING AND CUTTING MACHINE.

1,053,197.  Specification of Letters Patent.  Patented Feb. 18, 1913.

Application filed March 27, 1911. Serial No. 617,061.

*To all whom it may concern:*

Be it known that I, THOMAS A. MIGHILL, residing at Cambridge, in the county of Middlesex and State of Massachusetts, have invented an Improvement in Peat Laying and Cutting Machines, of which the following is a specification.

In preparing peat for the market, unless care is taken to carry out the various steps in the process with great economy, the cost will be prohibitive for any ordinary use. I have adopted a process of treatment or system which I believe is capable of successful commercial use and the machines used in the various steps thereof, so far as new, are or will be set forth in this and other applications for Letters Patent, for instance in applications for Letters Patent, for a bed for drying-peat, Serial No. 617,060; a machine for turning over peat blocks, Serial No. 617,057; and a machine for picking up dried peat-blocks Serial No. 622,256; but the machine forming the subject-matter of this application is equally well adapted for use independently of such other machines.

This invention relates to peat-laying and cutting machines, which is one of the machines of my new system, and is employed in an organized machine adapted to be propelled over a drying-bed and to automatically deliver wet peat to and lay it upon the drying-bed and to arrange it in the form of blocks, of suitable size for fuel, as the machine advances.

Before the peat is loaded on my machine it is dug from the bog and treated, so far as necessary, to reduce it to a condition of suitable plasticity for spreading, by any desired apparatus. The machine here described is designed to take into its hopper a load of the peat so prepared directly from the spout of the macerating machine, if desired, and convey it to the drying field, which may be a field prepared with a layer of finely divided dry peat and a gridiron of tracks, as set out in my copending applications above referred to, and lay it in a sheet on the drying-bed, and cut it or mark it out in blocks, continuously and automatically as the machine advances. The idea of laying out peat in sheets and cross-marking it in squares thereafter by hand is old, but an organized apparatus for doing it continuously and automatically is new, both broadly and in many details.

The machine comprises essentially a car having suitable propelling-means to move it over a drying-bed at a good speed, a hopper arranged on the car for the wet peat having an elongated opening at the bottom through which the wet peat flows in sheet form for delivery upon the bed, and a suitable closure for said opening, whereby the opening may be closed or opened to any extent desired to regulate the delivery. The wet peat in a plastic state so that it will flow from the hopper, in sheet form, is placed in the hopper, and when delivered to or deposited upon the drying-bed will form on said bed a layer of substantial yet approximately even thickness. Behind the hopper a leveling-board may and preferably will be arranged, which is adapted to be thrown into and out of operative position, and its elevation suitably adjusted. This board, when employed, acts to level the surface of the layer of wet peat which is deposited upon the drying-bed. Behind said leveling-board cutters are arranged, adapted to cut the layer of wet peat in the direction of movement of the apparatus, and a cutting-device is also arranged adapted to cut the layer of wet peat crosswise to the direction of movement of the car, thus dividing the layer of peat into blocks of suitable size to be conveniently manipulated.

The transverse cutting-device is provided with operating-means to reciprocate it vertically, and with supports which are movable with respect to the car, in such manner that said cutting-device is prevented from advancing with the car while entering the layer of wet peat to cut it, so as not to drag therein, and is subsequently advanced more rapidly than the car while disengaged from the layer of wet peat, to return to its former forward position for the next cutting operation.

The car is propelled continuously and the operating-means for the transverse cutting-device is operatively connected with the propelling-means or its wheels, to reciprocally operate said cutting-device as the car advances at definite intervals of space, so as to cut the layer of peat and thus form the blocks the size of which is independent of the speed of the car, but corresponds to the distance traveled, being determined by the relative timing of the operating-means and the propelling-means.

Figure 1 is a plan view of a peat-laying and cutting-machine embodying this invention. Fig. 2 is a side elevation of the machine shown in Fig. 1. Fig. 3 is a front elevation, partially broken away, of the machine shown in Fig. 1. Fig. 4 is a detail of the means to control the leveling-board. Fig. 5 is a detail of a modified means to control the leveling-board. Fig. 6 is a detail of the means to control the cutters which cut the wet peat in parallel with the direction of movement of the apparatus. Fig. 7 is a detail of a modified means to control said cutters. Fig. 8 is an enlarged detail of said cutters. Fig. 9 is a front view of said cutters and controlling-means therefor. Fig. 10 is a detail of the operating-means to reciprocate the transverse cutting-device. Fig. 11 is a fragmentary view of the transverse cutting-device and supports therefor and operating-means and a portion of the layer of wet peat which is being cut. Fig. 12 is a diagram of the layer of wet peat arranged on a drying-bed showing its arrangement when divided into blocks.

15 represents a drying-bed, which may be of any suitable construction, so far as my present invention is concerned; but preferably is composed of finely divided dry peat, as such a bed not only possesses advantages for drying wet peat, but also admits of the cutters sinking into its surface to insure cutting entirely through the layer of wet peat when forming the blocks. The drying-bed may be prepared between a pair of rails 16, 16, on which the apparatus is propelled.

20 represents the platform of the car, mounted on axles 22 bearing wheels 21, and, as the car is designed to be propelled along on a track over the drying-bed the wheels will be made to run on said track. The axles 22 may be positively driven by any suitable motor, thus providing power-operated propelling-means, comprising essentially the motor, axle and wheels. An electric-motor 25 may be employed, which is geared to one of the axles 22, the other axle being connected with the aforesaid axle by a sprocket-chain 26; or the car may be drawn along by a cable.

30 represents a hopper of any suitable construction, but of large capacity, adapted to receive the wet peat which is to be delivered to or deposited upon the drying-bed. As here shown said hopper is arranged on the car and has an elongated exit at the bottom adapted to be closed by a pair of lids 31, 31, pivoted at 32, and connected by chains 33 with a shaft 34, arranged at the top of the hopper and adapted to be turned by a worm-shaft 35 engaging a worm-wheel 36 on said shaft 34 and operated by a hand-wheel 37. Said closing-lids 31, 31, may be set in any position of adjustment by turning the shaft, so that an exit of any desired area is obtained, or the exit may be entirely closed. The closing lids are each provided with end walls which extend beyond their front edges, and the end walls of the lids overlie one another, thus preventing the formation of openings at the ends of the hopper.

In lieu of the closing-lids here shown, other closing means may be employed, but it is quite important that the closing-means employed shall be provided with regulating-means, whereby the size of the opening may be regulated, for the reason that the consistency of the wet peat varies considerably and the force of delivery also varies according to the quantity of wet peat contained in the hopper, due to the pressure of the volume of wet peat.

The wet peat flows from the hopper through the elongated exit in sheet form, and is delivered upon the drying-bed; and 40 represents the layer of wet peat which is thus delivered. Behind said hopper a leveling-board 45 is or may be arranged, which may be or may not be used. It is extended transversely across the drying-bed and is employed to level the surface of the layer of wet peat thereon. As here shown it is attached to an upright frame 46, adapted to slide vertically in guideways in the main-frame, and said upright frame has rack-bars 47 at its ends which engage pinions 48 secured to a shaft 49, adapted to be turned by a hand-wheel 50, and prevented from backward rotation by a pawl 51, engaging a ratchet-wheel 52, secured to said shaft. In lieu of this means to operate the leveling-board, any other suitable means may be employed, as such means forms no part of my present invention, and, in fact the provision of the leveling-board or its employment, if provided, is optional. As an equivalent means to control the position of the leveling-board, worm-gearing may be employed, such for instance, as represented in Fig. 5, wherein rack-bars 55 having worm-teeth are substituted for the rack-bars 47, which are engaged by worms 56, secured to short shafts 57, bearing bevel-gears 58 which are engaged by bevel-gears 59, secured to a shaft 60, bearing a hand-wheel.

Behind the leveling-board a set of cutters are provided to cut the layer of wet peat in a direction corresponding to or in parallel with the direction of movement of the car. Said cutters are arranged in parallel and in a row extended transversely with respect to the drying-bed, and as many may be employed, as desired. In the present embodiment of my invention the cutters are made independently movable on their supports and are independently weighted, and are trailed along in the wet peat as the car advances.

70 represents the cutters, which are here shown as flat plates, set edgewise, and pivotally supported at their forward ends on a stationarily supported bar 71, so that they are each free to rise and fall. They are extended rearwardly, and their lower edges engage the layer of wet peat to cut the same. Their downward movements and consequently their lowermost positions are controlled by chains 74, or other means. On each plate a pin 72 may be erected on which a weight or a number of weights 73 may be placed, the weights employed varying according to the consistency of the layer of wet peat to be cut. It is preferable, however, to weight the cutters quite heavily, in order that each cutter may cut entirely through the layer of wet peat, and even enter the surface of the drying-bed a short distance, which is an advantage. The chains 74 are connected to arms 75 secured to a shaft 76, having a hand-wheel 77 for turning it, and bearing a ratchet-wheel 78 engaged by a pawl 79 for preventing backward motion. By turning said hand-wheel 77 the shaft 76 is turned and all of the cutters lifted above the surface of the layer of wet peat. Or, upon disengaging the pawl from the ratchet, all of the cutters will be permitted to fall by gravity, their downward movements being limited by the chains and the position of the lifting means. The lifting means, of course, may be set to limit the downward movement of the cutters at any desired elevation. Or, in lieu of employing the pawl 79 and ratchet 78 the shaft 76 may have secured to it a worm-wheel 80, see Fig. 7, which is engaged by a worm 81, secured to a shaft bearing a hand-wheel 82. This actuating-means permits of turning the shaft 76, in either direction, and has advantages over the pawl and ratchet construction shown in Fig. 6. The particular construction of the means to lift the cutters 70, however, forms no part of my present invention, hence any other means may be employed in lieu of the means here shown, so long as the cutters are supported in such manner as to be independently movable on their supports, their lowermost positions adjusted to different elevations, and all lifted simultaneously to an elevation above the layer of wet peat. As the apparatus moves continuously along on the track, these cutters 70 will be trailed along and will cut the layer of wet peat to a suitable depth, according to the positions they occupy, and in parallel lines in the direction of movement of the apparatus, to thereby form parallel rows of wet peat. Behind said cutters 70 a transversely arranged cutting-device is provided, to cut the layer of wet peat crosswise to the direction of movement of the machine or transversely, although it is obvious that its position with respect to the cutters 70, is immaterial. Said transverse cutting-device is arranged horizontally and extends from side to side of the machine to cut the layer of peat which is delivered from the hopper from side to side, and while my invention is intended to include any form of cutting-device thus arranged relative to and in combination with the other parts of the machine, yet the specific form of cutting-device here shown possesses certain advantages. The cutting-device here shown consists of a rod or bar 90, extended horizontally, and transversely with respect to the drying-bed, from side to side thereof, and said bar 90 is attached to the lower ends of arms 91, any suitable number being employed, which are extended downwardly from a cross-bar 92, having at its ends upright bars 93, arranged to slide vertically in boxes 94, 94. The cutter-bar 90 is thus borne by a frame comprising an open structure whereby a wide space is provided above the bar or between it and the cross-bar 92, and as it is forced down into the layer of wet peat it will act to cut the same, and on account of its small size and of the open frame bearing it, may be withdrawn from the wet peat in a reasonably clean condition, that is to say, the wet peat will not adhere to it to any great extent. The boxes 94, 94, which support the vertically sliding bars are arranged one above the other, at each side of the apparatus, to thus guide the frame of the cutting-device while it is being moved vertically, and said boxes at each side of the car are movable horizontally in suitable ways provided for them. Such horizontal movement of the boxes is provided for the purpose of preventing the cutting-device, when depressed and acting to cut the wet peat, from advancing while the car continues to advance, and enables the cutting-device while elevated and out of action, to advance more rapidly than the car advances, so as to return to normal forward position with respect thereto, preparatory to beginning the next cutting operation. The means employed to move said boxes to thus hold and advance the cutting-device is connected with the means employed to reciprocate said cutting-device, so that the action may be easily and correctly timed.

Referring to Figs. 2, 3, 10 and 11, the upright vertically sliding bars 93, 93, of the frame of the cutting-device are connected by a horizontal rod 95, and links 96 connect said rod with eccentrics 97, secured to a horizontal driving-shaft 98, and said driving-shaft is positively driven. As here shown a sprocket-chain 99, passing around a sprocket-wheel on said shaft and around a sprocket-wheel 100 on a clutch-member 101, is adapted to be engaged by a clutch-member 102 on a shaft 103, bearing a sprocket-wheel 104 over which passes a sprocket-chain 105, which passes over a sprocket-wheel 106, secured to one of the axles 22. When the members of the clutch are in engagement and the car is advancing the driving-shaft 98 is positively rotated, and by the eccentric thereon the cutting-device is vertically reciprocated, to cause it to enter the layer of wet peat and cut it transversely on its downward movement, and to return it to normal on its upward movement. For the purpose of reciprocating the boxes 94, 94, horizontally, to move them in a rearward direction while the car advances during the last part of the downward and the first part of the upward movement of the cutting-device and then to move them in a forward direction and at a speed greater than the speed of movement of the car during the last part of the upward movement and the first part of the downward movement, heart-shaped cams may be employed arranged to separately operate each box. 110, 112 represent the heart-cams on each side of the car. The uppermost cams 110 are secured to the driving-shaft 98, to be revolved by said shaft, and the lowermost cams 112 are secured to a shaft 113, which is positively driven from the driving-shaft 98, as for instance, there may be a sprocket-wheel 115, secured to the driving-shaft 98, over which a sprocket-chain 116 passes, which also passes around a sprocket-wheel 117 secured to the shaft 113. This means for positively driving all the cams insures their movement in unison, but my invention is not limited to the particular means here shown for the accomplishment of this result.

It will be noted that as the reciprocating cutting-device is adapted to be connected with and disconnected from the means employed to propel the car, or in other words, the propelling-means, that as the car advances and lays a sheet of wet peat on the drying-bed, said cutting-device will be reciprocally operated to cut said sheet transversely and at the same time the trailing cutters will operate to cut said sheet in the direction of movement of the car, so that the sheet will be cut into blocks automatically as the car advances, the operator merely controlling the starting and stopping of the operation. Furthermore, the blocks will be formed of a size which may be predetermined according to the relative timing of the operating-means for the transverse cutting-device and the propelling-means, so that regardless of the speed of the car the blocks will all be cut of the same size.

In case the blocks once cut should run together, by reason of a rain or any other cause, and it becomes necessary to recut or reform them, the car, with its hopper empty, may be run over the drying-bed and this result accomplished.

I claim:—

1. In a machine for laying and cutting peat, the combination of a car, propelling-means to move said car over a drying-bed, a hopper on the car having an elongated exit to deliver wet peat in sheet form upon a drying-bed, cutters arranged to cut said sheet in parallel with the direction of movement of the car, and a cutting-device arranged to cut said sheet transversely with respect to the movement of the car, and means to reciprocally operate said cutting-device, said cutters and cutting-device both being movable to positions above the surface of said sheet, whereby the machine may be moved over the drying-bed without cutting said sheet, substantially as described.

2. A portable peat laying and cutting machine comprising a car running on wheels, a hopper on the car having an elongated exit to deliver wet peat in sheet form upon a drying-bed, a closure for said exit adapted to occupy different positions, whereby the exit may be closed or opened to such extent as is desired, cutters on said car behind said hopper to cut the sheet of wet peat in the direction of movement of the car, means to raise and lower said cutters and hold them at any desired elevation while in action and at an elevation above the sheet of wet peat while out of action, a cutting-device also on said car behind said hopper to cut the sheet of wet peat crosswise to the direction of movement of the car, and means operatively connected with the car-wheels to reciprocate said cutting-device vertically as the car advances at definite intervals of space, so as to cut the sheet of wet peat into blocks the size of which is independent of the speed of the car, and means to disconnect said cutting-device from its operating-means, whereby it may occupy a position above the sheet of wet peat while out of action, substantially as described.

3. A peat laying and cutting machine comprising a car running on wheels, a hopper for the peat arranged thereon having an opening for the exit of the peat and a closure for said opening whereby the opening may be closed or opened to such extent as is desired, cutters on said car behind said hopper to cut the laid peat in the direction of movement of the car and means to raise and lower said cutters as desired, a cutting-device also on said car behind said hopper to cut the peat crosswise to the direction of movement of the car and means operatively connected with the car wheels to move the crosswise cutting-device downward and upward at definite intervals of space to cut the laid peat crosswise and to move the cutting-device rearwardly relative to the car at substantially the speed of the car while the cutting-device is in the laid peat and to move the cutting-device forward relatively to the car while the cutting-device is above the laid peat, so as to return it to its forward position for the cutting of the next row of blocks, substantially as described.

4. A peat laying and cutting machine comprising a car, propelling-means for the car, a hopper for the peat arranged on the car having an opening for the exit of the peat, and a closure for said opening, regulating-means for said closure to vary the size of the opening and close the same, cutters arranged behind said hopper to cut the layer of peat in the direction of movement of the car, and means to raise and lower said cutters and hold them at different elevations, a horizontal cutting-device extended from side to side of the car to cut the layer of peat crosswise to the direction of movement of the car, and means adapted to be connected with and disconnected from the propelling-means for the car to operate said cutting-device vertically as the car advances, substantially as described.

5. In a machine for laying and cutting wet peat, the combination of a car, propelling-means to move the car over a drying-bed, a hopper on the car having an elongated exit to deliver the wet peat in sheet form, means to close said exit and to regulate the flow of wet peat therefrom, a set of cutters behind the hopper arranged in parallel with the direction of motion of the car, a horizontal cutting-device also behind the hopper arranged transversely with respect to the direction of movement of the car, and means operatively connected with the propelling-means to reciprocally operate said cutting-device in a vertical and also in a horizontal direction, substantially as described.

6. In a machine for cutting wet peat, the combination of a car, propelling-means to move it, and a plurality of independently movable cutters arranged in parallel with the direction of motion of the car, separate flexible means connected to each cutter which limits its downward movement, and permits of its upward movement, and actuating-means to which all of said flexible means are connected, substantially as described.

7. In a machine for cutting wet peat, the combination of a car having means to deliver upon a drying-bed a sheet of wet peat, a plurality of pivotally supported trailing cutters set edgewise and arranged to cut the wet peat in the direction of movement of the car, a rotatable shaft, separate chains connecting said cutters with said shaft, means to rotate said shaft to raise and lower the cutters, and means to hold said shaft in any position it may be set, substantially as described.

8. In a machine for cutting wet peat, the combination of a car, propelling-means to move it over a drying-bed, and a vertically reciprocating cutting-device arranged transversely with respect to the movement of the car, boxes to support said cutting-device, and means to move said boxes in a direction opposite the movement of the car and at a corresponding speed while the cutting-device is operating to cut the wet peat, whereby the cutting-device ceases to advance with the car during such time, substantially as described.

9. In a machine for cutting wet peat, the combination of a car, propelling-means to move it over a drying-bed, and a vertically reciprocating cutting-device arranged transversely with respect to the movement of the car, boxes to support said cutting-device, means to move said boxes in a direction opposite the movement of the car and at a corresponding speed while the cutting-device is operating to cut the wet peat, whereby said cutting-device ceases to advance with the car during such time, and means to subsequently move said boxes in the opposite direction at a speed greater than the speed of the car, substantially as described.

10. In a machine for cutting wet peat, the combination of a car, propelling-means to move the car over a drying-bed, a cutting-device arranged transversely with respect to the movement of the car, horizontally sliding boxes for the cutting-device, a driving-shaft, means operated by said shaft to reciprocate the cutting-device vertically, and means also operated by said shaft to reciprocate horizontally the sliding boxes for the cutting-device, substantially as described.

11. In a machine for cutting wet peat, the combination of a car, propelling-means to move it over a drying-bed, a cutting-device arranged transversely with respect to the movement of the car, horizontally sliding boxes for the cutting-device, a driving-shaft, means operated by said shaft to reciprocate the cutting-device vertically, and cams operated by said shaft to reciprocate horizontally the sliding boxes for the cutting-device, substantially as described.

12. In a machine for cutting a sheet of wet peat reposing on a drying-bed, a transversely arranged cutter consisting of a horizontal bar to cut the sheet of wet peat and a frame to which it is attached by means to provide an open space between it and the frame, substantially as described.

13. In a machine for cutting a sheet of wet peat reposing on a drying-bed, a transversely arranged cutter consisting of a horizontal bar to cut the sheet of wet peat, and a frame to which it is attached, said bar being arranged below the frame with an open space between it and the frame, said space being of a depth approximately as great as the depth of the sheet of peat to be cut, whereby the bar is permitted to pass entirely through the sheet of peat and the frame prevented from coming in contact therewith, substantially as described.

In testimony whereof, I have signed my name to this specification in the presence of two subscribing witnesses.

THOMAS A. MIGHILL.

Witnesses:
B. J. NOYES,
H. B. DAVIS.

Copies of this patent may be obtained for five cents each, by addressing the "Commissioner of Patents, Washington, D. C."